UNITED STATES PATENT OFFICE.

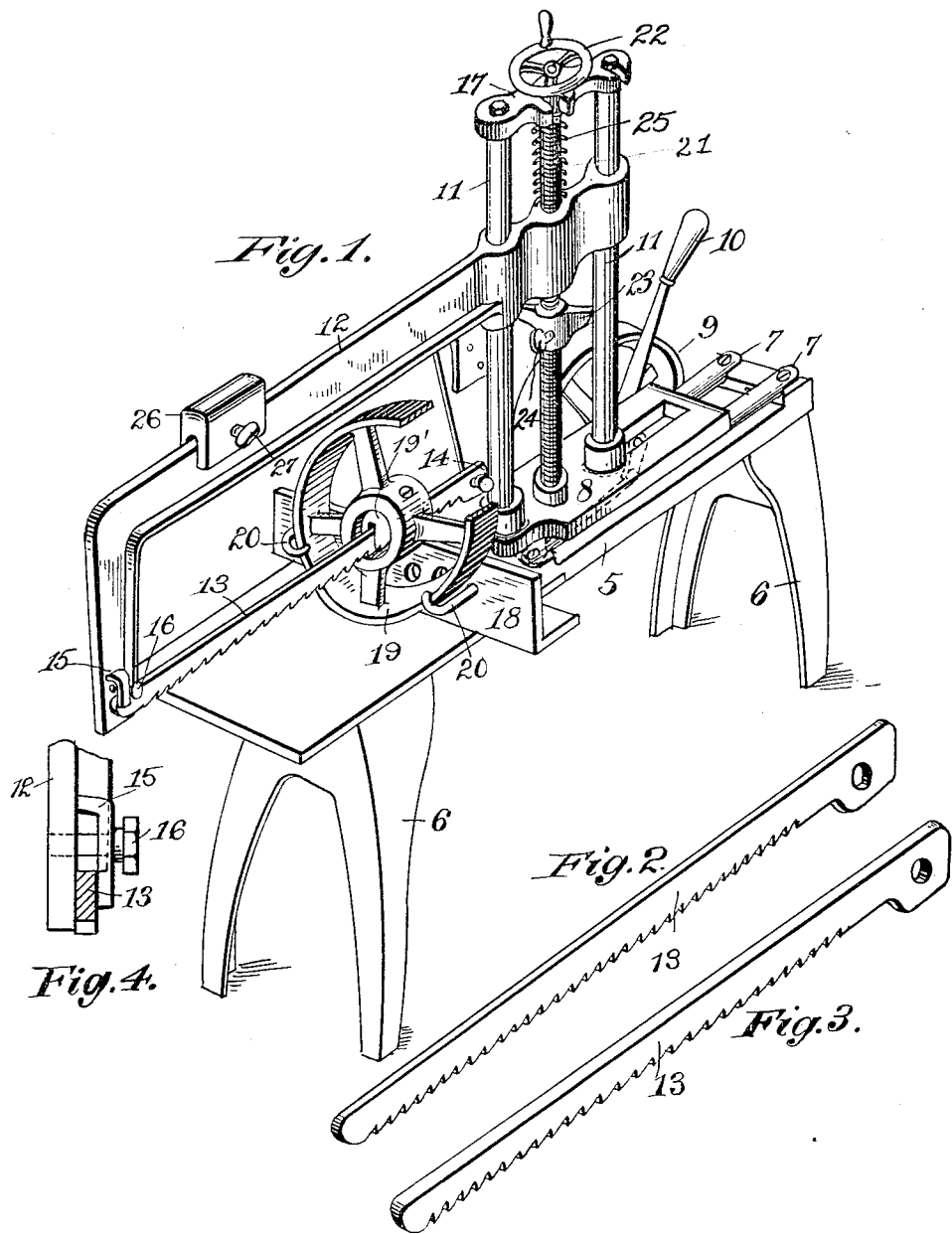

EMANUEL RAU, OF NEW YORK, N. Y.; ALEXANDER W. RAU ADMINISTRATOR OF SAID EMANUEL RAU, DECEASED.

APPARATUS FOR CUTTING KEYWAYS IN PULLEYS AND THE LIKE.

1,120,652.  Specification of Letters Patent.  Patented Dec. 8, 1914.

Application filed September 7, 1911. Serial No. 648,138.

*To all whom it may concern:*

Be it known that I, EMANUEL RAU, a citizen of the United States, residing in the borough of Brooklyn, in the county of Kings, city and State of New York, have invented new and useful Improvements in Apparatus for Cutting Keyways in Pulleys and the like, of which the following is a specification.

This invention relates to apparatus to cut keyways in pulleys, sheaves and the like, and is in the nature of a hack saw to which purpose it may be readily adapted, and it is the object of the invention to provide an apparatus of this character which is simple and cheap in construction and efficient in operation.

With this object in view I provide a suitable bed and mount thereon a reciprocable carriage, suitable means being provided to reciprocate the same, and fix to said bed a holder to which the work is clamped. A suitable cutter carrier, in the present instance a saw-blade carrying-frame, is mounted on the carriage to have vertical adjustment, with means to adjust the carrier and limit the movement thereof.

In the drawings accompanying and forming a part of this specification, Figure 1 is a perspective view of my improved apparatus, showing a pulley clamped to the work-holder and a keyway being cut therein. Figs. 2 and 3 are perspective views of different cutters; and Fig. 4 is a detail view to illustrate the means to releasably connect a cutter to its carrier.

Similar characters of reference designate like parts throughout the different views of the drawings.

In the embodiment of my invention illustrated in the drawings I have shown the same as comprising a bed 5 supported upon standards 6 which may be constructed integral with the bed. Mounted in ways 7 on said bed is a reciprocable carriage 8 having a crank and pitman connection with the shaft of a driving pulley 9 connected by a belt to any suitable source of power. The movements of the carriage are controlled by a lever 10.

A pair of vertical posts 11, 11 are fixed in the carriage 8 upon which posts is mounted a cutter-carrier 12, in the present instance a saw-blade carrying-frame, said carrier having vertical sliding movements on the posts, and said posts being connected at their upper ends by a releasable bar 17. A cutter 13 is releasably connected to said carrier by means of a screw 14 at one end, the other end of which is clamped thereto by a clamping member 15 and a screw 16. By thus mounting the cutter carrier upon the carriage 8 the movement thereof and the cutter is always parallel with the movement of the carriage assuring a straight cut.

A work-holder 18 is fixed to the bed 5 to which the object, in the present instance a pulley 19, is secured by means of a pair of clamping hooks 20, the holder being provided with a number of holes for the reception of the clamping hooks to accommodate the holder to pulleys of varying sizes. The cutter 13 passes through the bore of the hub of the pulley and as the cutter carrier and carriage are reciprocated moves back and forth therewith.

In order that the apparatus may be adapted to cut keyways in pulleys of varying sizes, the posts 11 are made of considerable length to permit of the up and down adjustment of the cutter carrier thereon. To adjust said carrier I provide a lead screw 21 rotatably mounted on the carriage 8 to extend between the posts and parallel therewith and passing through the cutter carrier. The lead screw is provided with a hand-wheel 22 and a nut 23. To adjust the carrier the nut 23 is held by one hand and the lead screw is rotated by means of the hand-wheel 22 with the other hand.

When a keyway is to be cut in a pulley the distance between the perimeter thereof and the outside of the bore in the hub is ascertained when the cutter is set to approximately said distance from the bed 5 by placing the hand on the nut 23 and rotating the lead screw 21 with the other hand either to the right or left according as to whether it is desired to raise or lower the cutter carrier. The cutter is then released by the clamping screw 16 and the pulley slipped thereon and clamped in position to the work holder when the cutter is again secured in place. The nut 23 also serves as a gage to limit the depth of the cut. Assuming that the depth of the keyway is to be one-quarter of an inch. The cutter carrier is set in the manner hereinbefore set forth so that the cutter will rest upon the work when the nut is rotated so that it is one-quarter of an inch below the carrier and secured in place by the set screw 24, as clearly shown in Fig. 1. As the cut progresses the cutter carrier is automatically lowered until it rests upon the nut 23, and while the cutter will still reciprocate the cut will progress no farther.

In order that the cutter may work efficiently it is necessary that pressure is applied thereto as it reciprocates, and for this purpose I provide a spring 25 confined between the connecting bar 17 and the cutter carrier. It is often found necessary, owing to the character of the metal of which the object being worked is made, that greater pressure be applied to the cutter and for this purpose I provide a weight 26 adjustable along the cutter carrier and secured in place by a set screw 27, the weight being adjusted inward or outward according to the pressure with which it is desired the cutter to bear upon the work. The cutters are made of different widths so as to make cuits of different width, as is shown in Figs. 2 and 3. Should it be desired to have the cutter bear on the work with a very light pressure the spring 25 may be removed by removing the connecting bar 17 one end of which is screw threaded on to the top of one of the posts 11 and secured to the top of the other post by a screw, said bar having a cut out portion for the reception of the lead screw. When the spring has been removed, or a weaker one substituted, the bar is again secured in place. If desired the bore in the hub of the pulley may be provided with a plug or bushing 19' having a longitudinal slot for the engagement of the cutter or saw to serve as a guide therefor, the bushing being secured in place by the set screw by means of which the pulley is fixed to a shaft.

Having thus described my invention, I claim:

In an apparatus of the class specified, the combination with a reciprocable carriage having a pair of vertical posts; a saw blade carrier mounted on said posts to have vertical adjustment thereon; a bar extending across and connected to the upper ends of said posts; a lead screw rotatably mounted at its lower end in the carriage to extend between the posts and passing through the carrier but having no connection therewith; a spring coiled about the lead screw and confined between the carrier and cross bar to exert a downward pressure on the saw blade carrier; and a nut on the lead screw below the carrier, said nut being adjustable to limit the downward movement of the carrier on the post; substantially as and for the purpose specified.

EMANUEL RAU.

Witnesses:
R. W. PITTMAN,
HERMAN H. PIEPER.

Copies of this patent may be obtained for five cents each, by addressing the "Commissioner of Patents, Washington, D. C."